United States Patent [19]

Ohata et al.

[11] Patent Number: 4,817,032

[45] Date of Patent: Mar. 28, 1989

[54] USER PROGRAMMABLE DATA PROCESSOR

[75] Inventors: Hideo Ohata, Machida; Ikuo Yoshihara, Tama; Yasuyuki Takahashi, Kawasaki; Masahiro Ishida, Katsuta, all of Japan

[73] Assignees: Hitachi Ltd.; Hitachi Microcomputer Engineering Ltd., both of Tokyo, Japan

[21] Appl. No.: 888,202

[22] Filed: Jul. 23, 1986

[30] Foreign Application Priority Data

Aug. 30, 1985 [JP] Japan ................................. 60-189664

[51] Int. Cl.⁴ .............................................. G06F 9/00
[52] U.S. Cl. ...................................................... 364/900
[58] Field of Search ... 364/200 MS File, 900 MS File, 364/200, 900

[56] References Cited

U.S. PATENT DOCUMENTS 4,297,743 10/1981 Appell et al. ........................ 364/200
4,353,653 10/1982 Zimmerman ....................... 364/900

Primary Examiner—Gareth D. Shaw
Assistant Examiner—John G. Mills
Attorney, Agent, or Firm—Antonelli, Terry & Wands

[57] ABSTRACT

In an analysis processor which utilizes a parameter table for setting a processing condition and analyzes data in accordance with the content of table, a process for registering/correcting the parameter table is standarized for various analysis processing programs so that each of the analysis processing programs is divided into an analysis processing procedure instruction section and a parameter table section. Thus, a plurality of different analysis process can be performed in one analysis processor. Any table in the analysis processing programs may be readily referred to by an instruction through a keyboard of the analysis processor and may be registered and corrected. Thus, a user can alter the analysis processing program as he/she desires.

7 Claims, 16 Drawing Sheets

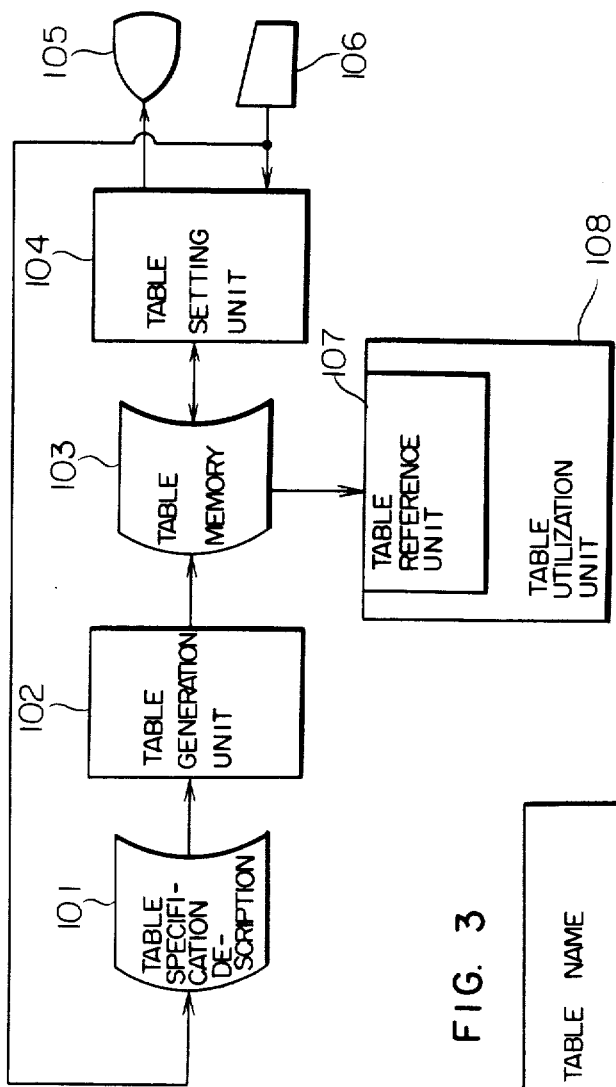

FIG. 4a

| 3 | 301 |

| | TABLE NAME | NUMBER OF ITEMS | LEADING ITEM POINTER |
|---|---|---|---|
| 1 | TABLE a | 2 | 1 |
| 2 | TABLE b | 3 | 3 |
| 3 | TABLE c | 2 | 6 |
| 4 | | | |
| 5 | | | |
| 6 | | | |

| | ITEM NAME | ITEM VALUE TYPE | ITEM VALUE POINTER |
|---|---|---|---|
| 1 | ITEM a1 | 00 | 1 |
| 2 | ITEM a2 | 02 | 1 |
| 3 | ITEM b1 | 01 | 1 |
| 4 | ITEM b2 | 02 | 2 |
| 5 | ITEM b3 | 01 | 2 |
| 6 | ITEM c1 | 00 | 2 |
| 7 | ITEM c2 | 01 | 3 |
| 8 | | | |
| 9 | | | |
| 10 | | | |

304 — INTEGER TYPE ITEM VALUE

| | |
|---|---|
| 1 | 12 |
| 2 | 0 |
| 3 | |
| 4 | |
| 5 | |
| 6 | |

305 — REAL NUMBER TYPE ITEM VALUE

| | |
|---|---|
| 1 | 3.14 |
| 2 | 0.0 |
| 3 | 2.71 |
| 4 | |
| 5 | |
| 6 | |

| | CHARACTER STRING LENGTH | CHARACTER STRING TYPE ITEM VALUE |
|---|---|---|
| 1 | 7 | BENZENE |
| 2 | 6 | XYLENE |
| 3 | | |
| 4 | | |
| 5 | | |
| 6 | | |

```
table    TABLEa;

item     ITEMa1    integer;
item     ITEMa2    string;

table    TABLEb;

item     ITEMb1    real;
item     ITEMb2    string;
item     ITEMb3    real;

table    TABLEc;

item     ITEMc1    integer;
item     ITEMc2    real;
```

USER PROGRAMMABLE DATA PROCESSOR

BACKGROUND OF THE INVENTION

The present invention relates to a data processor which makes use of a parameter table, and more particularly to an analysis processor applicable to various analyses such as gas chromatography analysis, mass analysis and spectro analysis.

In the analysis processor which is a main application of the present invention, (1) a number of parameters are required to set process conditions for measurement and analysis, and (2) in setting the process conditions, trial and error may be unavoidable when a user performs the analysis.

In the prior art analysis processor, a function to register a parameter table in accordance with set process conditions and a function to correct the registered parameter table are provided. In the part, a man-machine processing unit for registering and correcting the parameter table in accordance with the process conditions has been developed separately for each analysis processor. Accordingly, in the prior art analysis processor, since a specification of the parameter table and a method for indexing the parameter table have not been standardized, a new man-machine processing unit must be developed for each analysis processing. This leads to an increase in development cost and prevents various analysis processing being performed by one analysis processor.

As the analysis processor has been populated and the demand to ease its use has increased, the increase of a ratio of the development cost of the man-machine processing unit to the development cost of the overall processing program renders the separate development of the analysis processor very inefficient.

On the other hand, a user in a research area who is not satisfied by the processing functions which are normally equipped with an analysis processor strongly desires a user programmable processor. When it is desired to use a non-standardized parameter table from a user-prepared program, an address of the parameter table on a main memory, a specification of the parameter table and an indexing method to the parameter table must be known. Practically, such an analysis processor could not be fully utilized by a usual user.

SUMMARY OF THE INVENTION

It is an object of the present invention to provide a data processor having a high user programmability.

It is another object of the present invention to provide an analysis processor which can perform a plurality of different analysis processes in a simple and inexpensive manner.

In accordance with the analysis processor of the present invention, register/correct processing of the parameter table is standardized so that each analysis processing program is divided into a processing procedure section which utilizes the paramter table (table utilization section) and a parameter table section. As a result, it is not necessary to separately develop the man-machine processing unit for registering/correcting the parameter table for each type of analysis processor, and the development cost of the analysis processor is significantly reduced. Further, since the registering/correcting process of the parameter table is standardized, not only a programmer who develops the analysis-processing program but also the user can readily refer to the parameter table and amend the analysis process. By altering the entire processing procedure section of the analysis processing program, one analysis processor can readily perform different analysis processes.

In order to achieve the above features, the analysis processor of the present invention comprises:

(1) table generation means which receives table specification description which defines a table structure and stores information on the table structure, (2) table content setting means for setting the table in accordance with the table structure information stored in the table generation means, and (3) table content reference means for referring to the table content set by the table content setting means in accordance with the table structure information stored in the table generation means.

Thus, an analysis processor which does not depend on the table utilization section is provided. When the data processor or analysis processor is to be developed, the specification of the parameter table to be utilized is described. Thus, the setting and referencing processes can be shared by using the table content setting means and the table content referencing means.

In the table specification description for achieving the above objects, a table means and an item name are defined and elements in the table content can be logically designated by those names.

In sharing, it is important to identify a type of data. Thus, in the table specification description, a type attribute of an item value is defined to allow checking if the table content complies with the attribute.

BRIEF DESCRIPTION OF THE DRAWINGS

FIG. 2 illustrates processing of a parameter table in the apparatus of FIG. 1,

FIG. 3 shows a logical structure of the parameter table,

FIGS. 4a–4f show configurations of a table memory,

FIG. 5 shows an example of table specification,

DESCRIPTION OF THE PREFERRED EMBODIMENT

Figure 1:
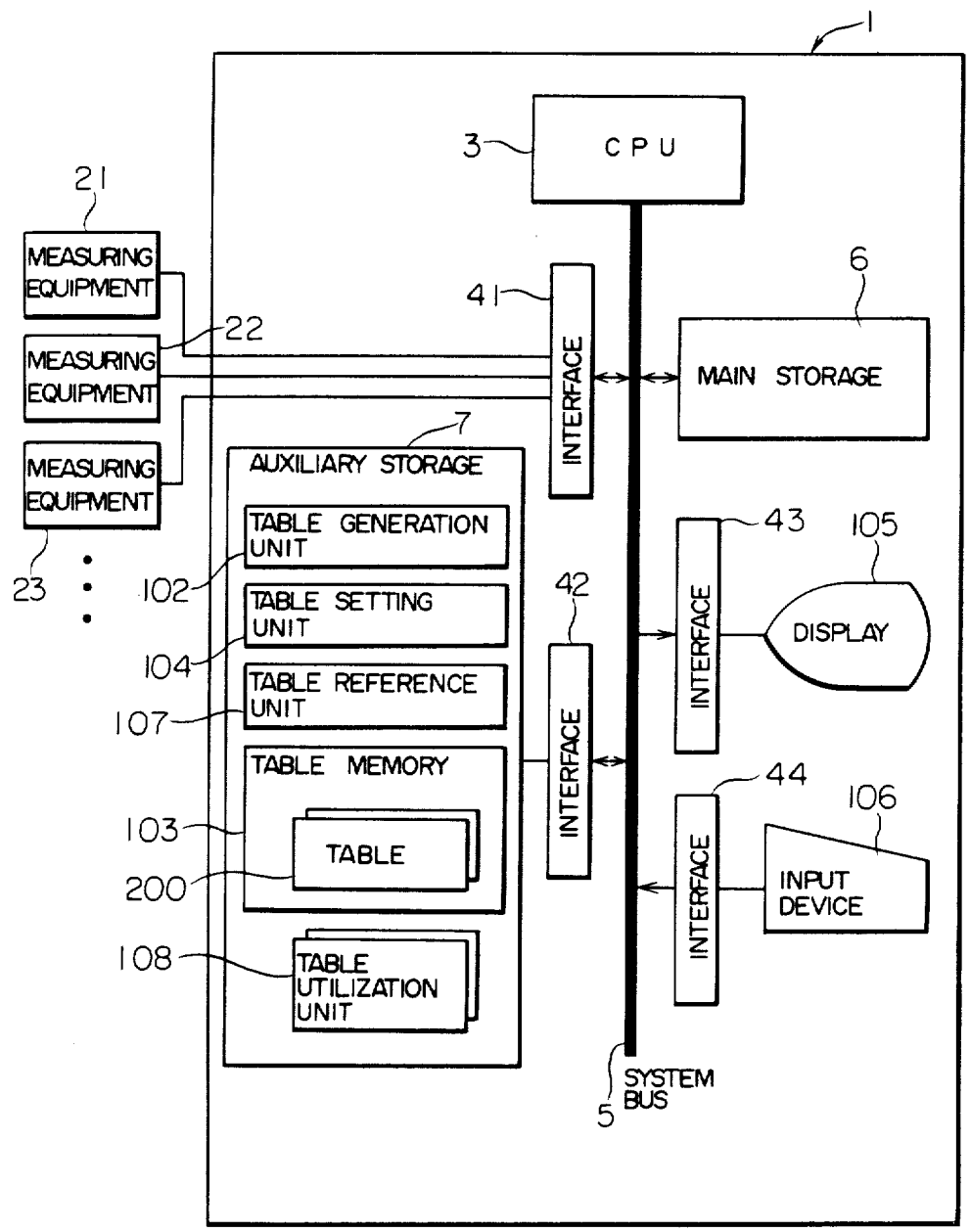
FIG. 1 shows a configuration of an embodiment of the present invention.
Figure 6:
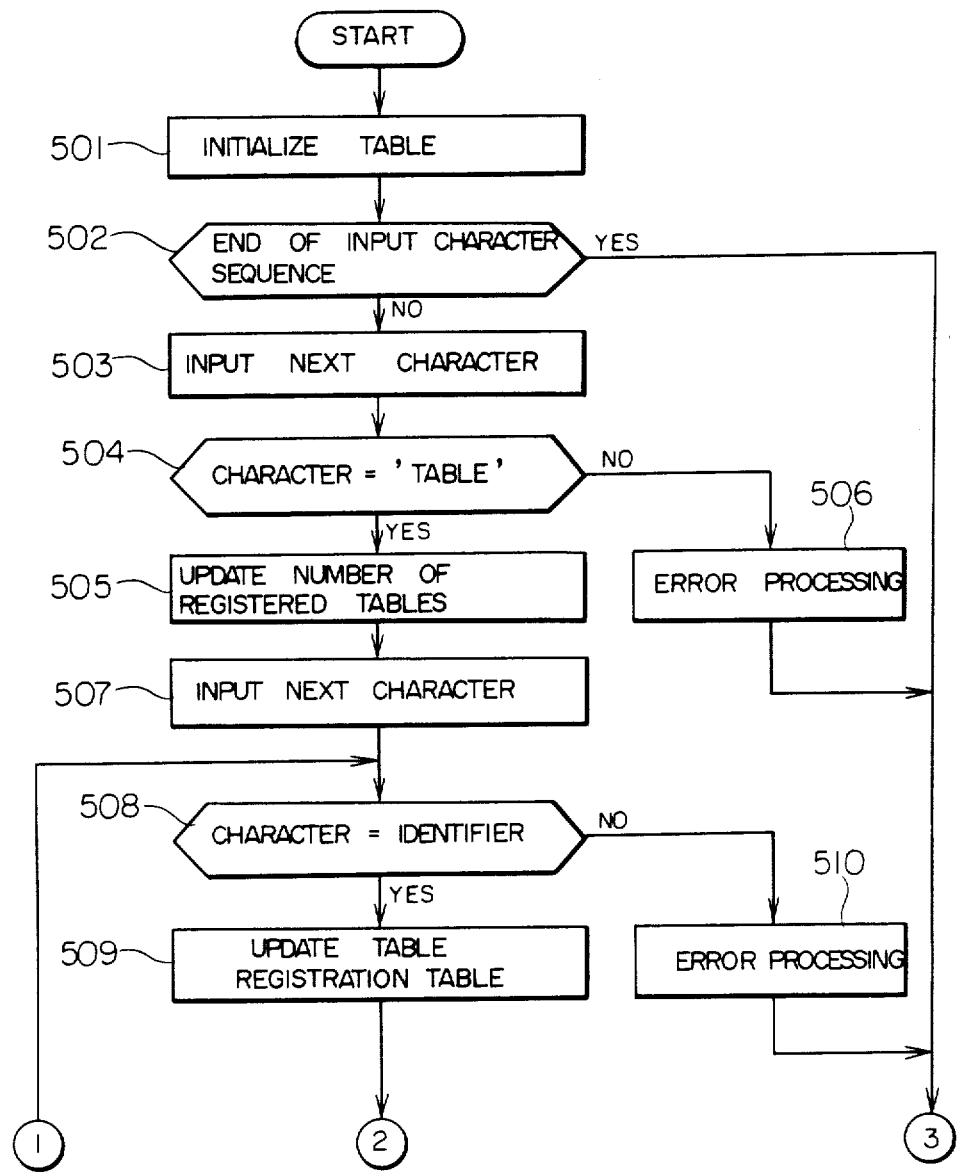
FIG. 6 is a first portion of a low chart of a processing procedure of a table generation area.
Figure 7:
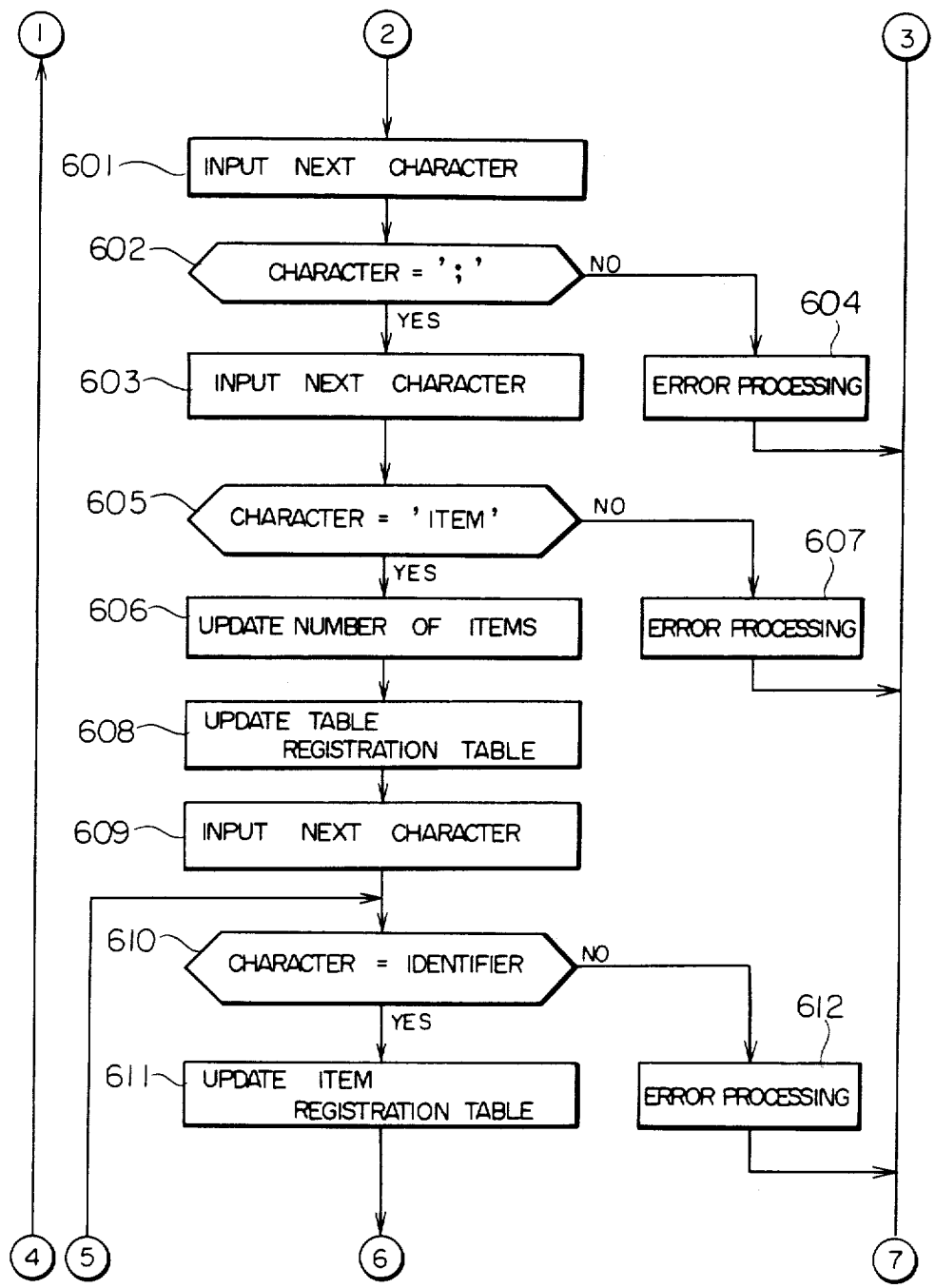
FIG. 7 is a second portion of the flow chart.
Figure 8:
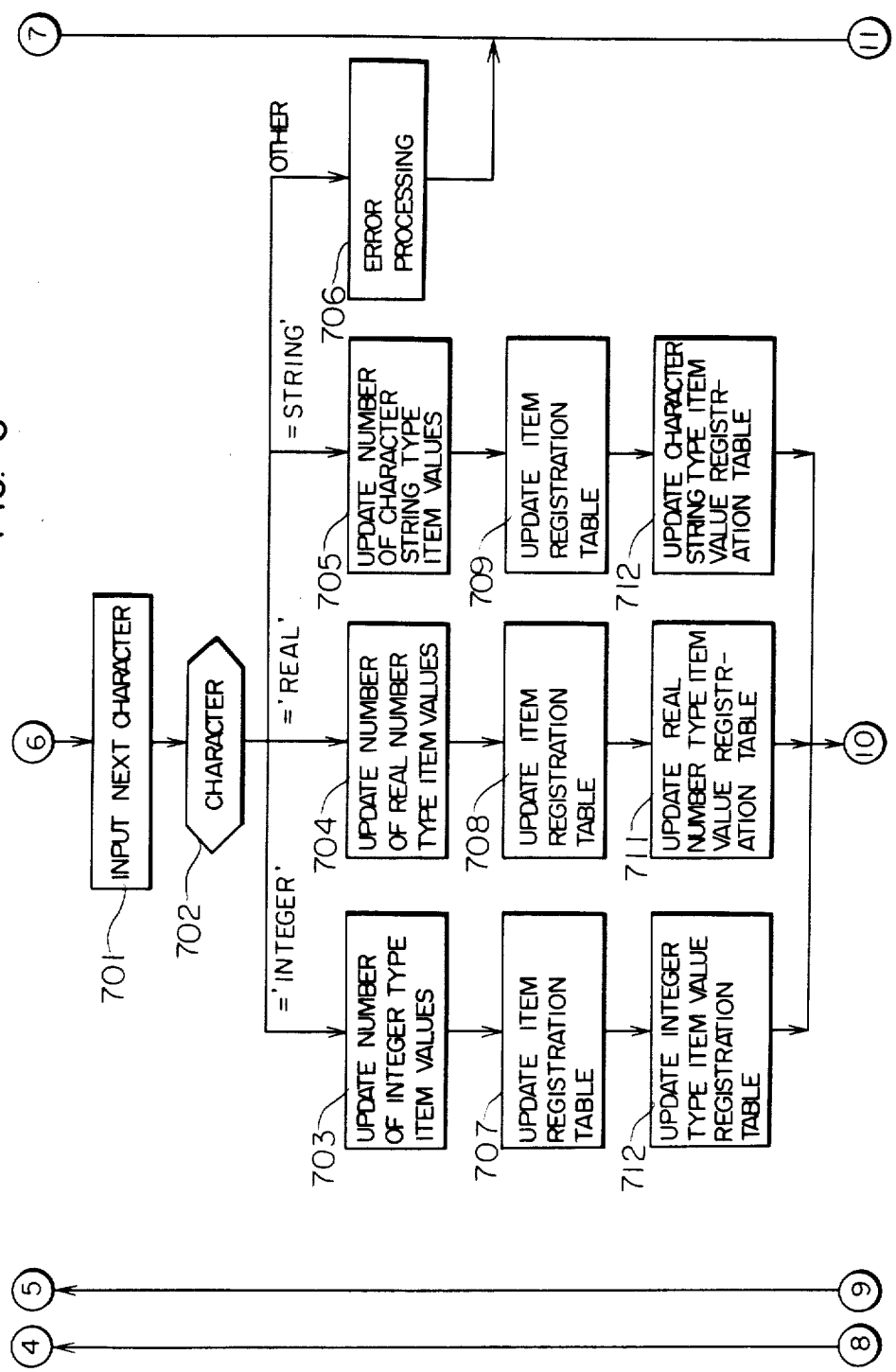
FIG. 8 is a third portion of the flow chart.
Figure 9:
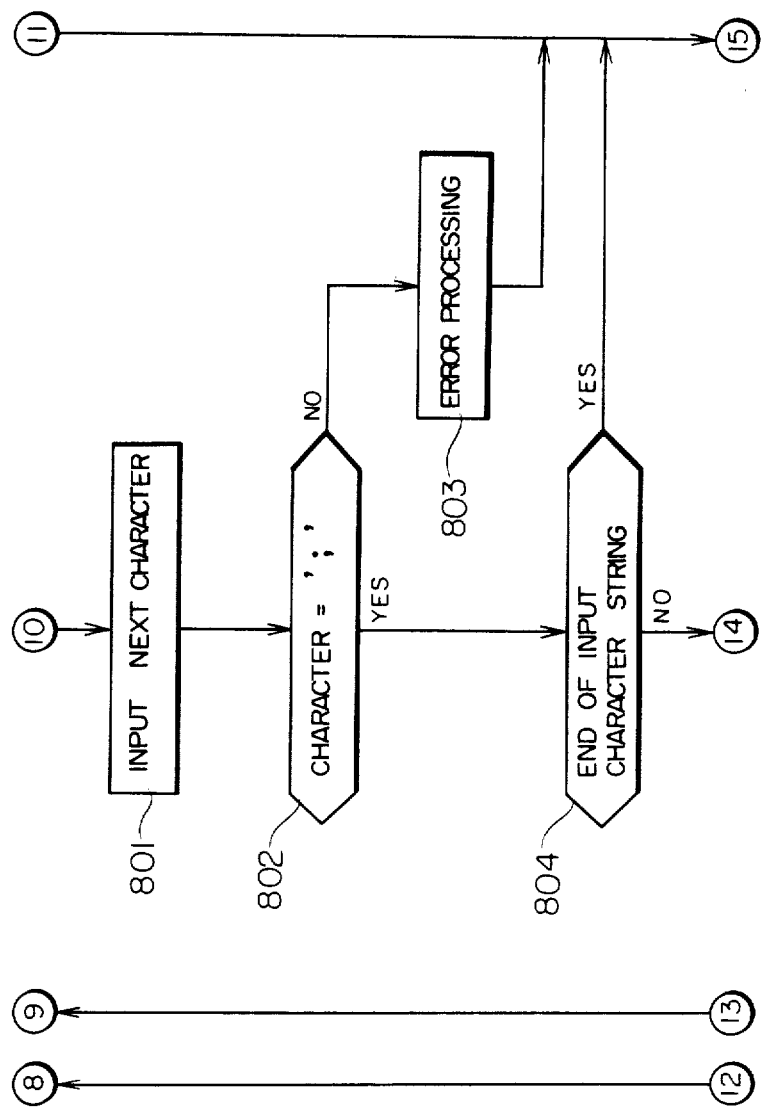
FIG. 9 is a fourth portion of the flow chart.
Figure 10:
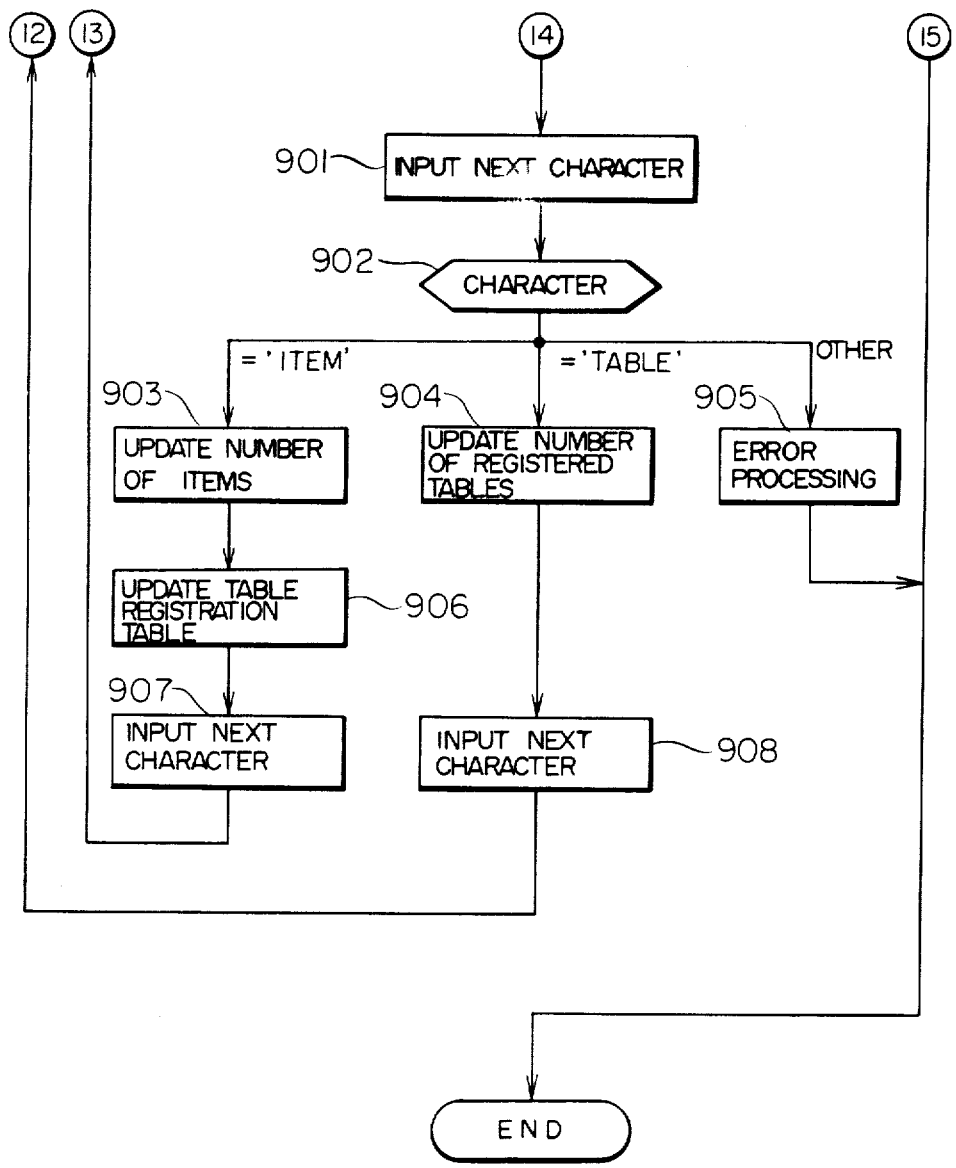
FIG. 10 is a fifth portion of the flow chart.

FIG. 1 shows one embodiment of an analysis processor in accordance with the present invention.

In FIG. 1, numeral 1 denotes an overall analysis processor. An object to be measured (not shown) is measured by using various measuring equipment 21, 22, 23. A central processing unit 3 in the analysis processor 1 processes measurement data sent from the measuring equipments 21, 22, 23, an stored in a main storage 6 through an interface 41 (for example, GP-IB interface) and a system bus 5 in accordance with an analysis processing program stored in main storage 6. Numeral 7 denotes an auxiliary storage such as a floppy disk in which a table generation area 102, a table content setting area 104 and a table content reference area 107 are stored. All or only a necessary one of those areas are read into the main storage and executed by the central processing unit 3. Numeral 103 denotes a parameter table memory which stores a plurality of parameter tables 200. The parameter tables 200 may be registered and corrected while they are stored in the auxiliary storage 7, or the parameter tables 200 may be temporarily read into the main storage 6 whose entries are registered and corrected, and then returned to the auxiliary storage 7 after the analysis processing has been completed. Numeral 108 denotes a table utilization area having a program corresponding to the analysis processing program which utilizes the table 103, stored in the auxiliary storage 7. All or a portion of this program are read into the main storage 6 one at a time and executed by the central processing unit 3. Numeral 105 denotes an output unit such as a CRT and numeral 106 denotes an input device such as a keyboard. The auxiliary storage 7, display unit 105 and input device 106 are connected to the system bus 5 through interfaces 42, 43 and 44, respectively.

1. Overall Configuration

FIG. 2 shows the process of the embodiment of FIG. 1. The utilization of a parameter table by the present invention comprises three steps.

(1) Generation of Table

Table specification description 101 expressed in accordance with a syntax to be described later is entered to the table generation area 102 to generate corresponding table structure information in the table memory 103.

(2) Setting of Table Content

The table content is set by the table setting area 104. Data is written into the generated table. The table setting area 104 receives from the input device 106 a command of displaying and setting the table content and processes the data in accordance with the content of the table memory. Necessary messages are supplied to the output unit 105.

(3) Reference to Table Content

The table utilization area 108, that is, the analysis processing program processes data in accordance with the setting content of the table. It refers a necessary table content through the table reference processing area 107. The table reference processing area is an aggregation of sub-routines which are read out, as required, for utilization.

2. Parameter Table Structure

FIG. 3 shows a logical structure of the parameter table 200.

The table 200 includes names which can be distinguished from each other. The table includes a plurality of items each storing its own value.

The items are identified by item names. Each item is accompanied with an attribute which defines a data type of the item value, and only the values of the matched types are registered as the item values. The type attribute is either integer type, real number type or character string type.

3. Table Memory Configuration

FIGS. 4a–4f show configuration of the table memory. The table memory comprises a number of registered tables 301, a table registration table 302, an item registration table 303, an integer type item value registration table 304, a real number type item value registration table 305 and a character string type item value registration table 306. In FIGS. 4a–4f, specific values are put in the tables.

(1) Number of Registered Tables (FIG. 4a)

The number of registered parameter tables in the table memory is stored in the number of registered tables column 301.

In the illustrated examples, three parameter tables are registered.

(2) Table Registration Table (FIG. 4b)

The table registration table 302 comprises a table name column 307, a number of items column 308 and a leading item pointer column 309.

The table name column stores the parameter table name to be registered. The number of items column stores the number of items belonging to that table. The leading item pointer column stores a pointer which points a leading position in the item registration table which stores the items belonging to that table.

In the illustrated example, a table named TABLEa and having two items, a table named TABLEb and having three tables, a and a table named TABLEc and having two items are registered. The items of the TABLEa are stored starting from first position of the item registration table, the items of the TABLEb are stored starting from third position of the item registration table, and the items of the TABLEc are stored starting from sixth position of the item registration table.

(3) Item Registration Table (FIG. 4c)

The item registration table 303 comprises an item name column 310, an item value type code column 311 and an item value pointer column 312.

The item name column stores the item names. The item value type code column stores codes of type attributes of the items. The code is 00 for the integer type, 01 for the real number type and 02 for the character string type. The item value pointer column stores pointers for pointing to storage locations of the corresponding item values. Depending on the type attribute, either the location in the integer type item value registration table, the location in the real number type item value registration table or the location in the character string type item value registration table is pointed.

In the illustrated example, a first one of the two items of the TABLEa is named ITEMa1 and of the integer type, and a second item is named TABLEa2 and of the character string type. The value of the ITEMa1 is stored in a first position in the integer type item value registration table, and the value of the ITEMa2 is stored in a first position in the character string type item registration table. Same is true for the ITEMb1, ITEMb2 and ITEMb3 of the TABLEb, and the ITEMc1 and ITEMc2 of the TABLEc.

(4) Integer Type Item Value Registration Table (FIG. 4d)

The integer type item value registration table comprises an integer type item value column 313 for storing item values.

In the illustrated embodiment, 12 is stored as the value of the ITEMa1 of the TABLEa and 0 is stored as the value of the ITEMc1 of the TABLEc.

(5) Real Number Type Item Value Registration Table (FIG. 4e)

The real number type item registration table 305 comprises a real number type item value column 314 for storing item values.

In the illustrated example, 3.14 is stored as the value of the ITEM1b of the TABLEb, 0.1 is stored as the value of the ITEMb3 of the TABLEb and 2.71 is stored as the value of the ITEMc2 of the TABLEc.

(6) Character String Type Item Value Registration Table (FIG. 4f)

The character string type item value registration table 306 comprises a character string length column 315 and a character string type item value column 316.

The character string length column stores the number of characters of the character string which is the item value. The character string type item value column stores the character string.

In the illustrated example, 'BENZENE' (length 7) is stored as the value of the ITEM a2 of the TABLEa, and 'XYLENE' (length 6) is stored as the value of the ITEMb2 of the TABLEb.

4. Type of Table Specification Description

FIG. 5 shows an example of a description of a table specification. It is used to generate the three parameter tables shown in FIGS. 4a–4f.

A first line indicates that the table name to be defined is TABLEa. The word 'table' is a description syntax key word which means start of table definition.

A second line indicates that the item of the TABLEa includes the item named ITEMa1 and of the integer type. The word 'item' is a key word which means start of item definition, and a word 'integer' is a key word which means integer type attribute.

A third line indicates that the item of the TABLEa includes the ITEMa2 of the character string type. A word 'string' is a key word which means a character string type attribute.

Fourth to seventh lines define the TABLEb comprising the real number type item ITEMb1, the character string type item ITEMb2 and the real number type item ITEMb3, and eighth to tenth lines defined the TABLEc comprising the integer type item ITEMc1 and the real number type item ITEMc2. A word 'real' is a key word which means the real number type attribute.

A general format of table specification description is as follows.

[Table sentence: [item sentence;] . . . ] . . .

where [] . . . means any number of times of repetition in [].

The table sentence and a series of item sentences following thereto define one table.

(1) Table Sentence

The table sentence means start of table definition. Description format is as follows.

table table name

The table has a name designated by the 'table name'. The items belonging to the table are described by a series of item sentences following to the table.

(2) Item Sentence

The item sentence describes the items of the table. The description format is as follows.

item; item name; type attribute

The item has a name designated by the 'item name'. The type attribute is given by any one of the keywords integer, real and string. The integer means the integer type, the real means the real number type and the string means the character string type.

5. Table Generation Area

FIGS. 6 to 10 show flow charts of processing procedures of the table generation area 102.

(1) In a step 501, the content of he table memory is initialized as follows.

(a) The number of registered tables 301 is reset to zero.

(b) The number of items is reset to zero.

(c) The number of integer type item values is reset to zero.

(d) The number of real number type item values is reset to zero.

(e) The number of character string type item values is reset to zero.

The number of items (b), the number of integer type item values (c), the number of real number type item values (d) and the number of character string type item values are variables which are utilized in the course of processing.

(2) In a step 502, it is determined whether an input character sequence from the table specification description has been terminated or not. If it has been terminated, the table generation process is terminated. If it has not, the process proceeds to a step 503 where the next character is entered from the input character sequence, and the process proceeds to a step 504.

(3) In the step 504, whether the input character is 'table' or not is checked. If it is 'table', the number of registered table 301 is incremented by one in a step 505, the next character is inputted in a step 507, and the process proceeds to a step 508. If it is not 'table', an error message is displayed in a step 506 and the table generation process is terminated.

(4) In the step 508, whether the character is an identifier which represents a name or not is checked. If it is not, an error processing is performed in a step 510 and the process is terminated. If it is, the table registration table 302 is updated as shown below in a step 509, the next character is inputted in a step 601 (FIG. 7), and the process proceeds to a step 602.

(a) The table name column 307 at n-th position (where n is the number of registered tables) of the table registration table 302 is defined as the input 'identifier'.

(5) In the step 602 (FIG. 7), it is determined whether the character is ';' error processing is performed in a step 604 and the process is terminated. If it is, the next character is inputted in a step 603 and the process proceeds to a step 605.

(6) In the step 605, whether the character is 'item' or not is checked. If it is not, an error processing is performed in a step 607 and the process is terminated. In a step 606, the number of items is incremented by one, in a step 608, the table registration table 302 is updated as shown below, in a step 609, the next character is inputted, and the process proceed to an step 610.

(a) The number of items column 308 at the n-th position (where n is the number of registered tables of the table registration table 302) is set to '1'.

(b) The loading item pointer column 309 of the n-th position (where n is the number of registered tables of the table registration table 302 is set to a current number of items.

(7) In the step 610, whether the character is an identifier or not is checked. If it is not, an error processing is performed in a step 612 and the process is terminated. If it is, the item registration table 303 is updated as shown below in a step 611, the next character is inputted in a step 701 (FIG. 8) and the process proceeds to a step 702.

(a) The item name column 310 at m-th position (where m is the number of items) of the item registration table 303 is set to the input identifier.

(8) In the step 702, the character is determined. If it is 'integer', the process proceeds to a step 703, if it is 'real', the process proceeds to a step 704, and if it is 'string', the process proceeds to a step 705. If it is neither of those, error processing is performed in a step 706 and the process is terminated.

(9) In the step 703, the number integer type item values is incremented by one, and in a step 707, the item registration table 303 is updated as follows.

(a) The item value type code column 311 at the m-th position (where m is the number of items) of the item registration table 303 is set to 00 which is the integer type item value code.

(b) The item value pointer 312 at the m-th position (where m is the number of items) of the item registration table 303 is set to the current number of integer type items.

In a step 710, the integer type item value registration table 304 is updated as follows. In a step 801 (FIG. 9), the next character is inputted, and the process proceeds to a step 802.

(c) The integer type item value column 313 at p-th (where p is the number of integer type item values) of the integer type item value registration table 304 is initialized to 0.

(10) In the step 704, the number of real number type item values is incremented by one. In a step 708, the item registration table 303 is updated as follows.

(a) The item value type code column 311 at the m-th position (where m is the number of items) of the item registration table 303 is set to 01 which is the real number type item value code.

(b) The item value pointer 312 at the m-th position (where m is the number of items) of the item registration table 303 is set to the current number of real number type item values.

In a step 711, the real number type item value registration table 305 is updated as follows. In the step 801 (FIG. 9), the next character is inputted and the process proceeds to the step 802.

(c) The real number type item value column 314 at the p-th position (where p is the number of real number type values) of the real number type item value registration table.

(11) In the step 705, the number of character string type items is incremented by one. In a step 709, the item registration table 303 is updated as follows.

(a) The item value type code column 311 at the m-th position (where m is the number of items) of the item registration table 303 is set to 02 as the character string type item value code.

(b) The item value pointer column 312 at the m-th position (where m is the number of items) of the item registration table 303 is set as the current number of character string type item values.

In a step 712, the character string type item value registration table 306 is updated as follows, in a step 801 (FIG. 9), the next character is inputted, and the process proceeds to a step 802.

(c) The character string length column 315 at the p-th position (where p is the number of character string type item values) of the character string type item value registration table 306 is initialized to zero.

(12) In the step 802, whether the character is ';' or not is checked. If it is not, an error processing is performed in a step 803 and the process is terminated. If it is, the process proceeds to a step 804.

(13) In the step 804, whether the input character sequence has ended or not is checked. If it has, the table generation process is terminated. If it has not, the process proceeds to a step 901 (FIG. 10) where the next character is inputted, and the process proceeds to a step 902.

(14) In the step 902, the character is determined. If the character is 'item', the process proceeds to a step 903, and if it is 'table', the process proceeds to a step 904. If it is none of them, an error processing is performed in a step 905 and the process is terminated.

(15) In the step 903, the number of items is incremented by one. In a step 906, the table registration table 302 is updated as follows. In a step 907, the next character is inputted and the process returns to the step 610.

(a) The content of the number of items column 308 at the n-th position (where n is the number of registered table) of the table registration table 302 is incremented by one.

(16) In the step 904, the number of registered tables 301 is incremented by one. In a step 908, the next character is inputted and the process returns to the step 508.

In the above flow charts, an error processing when one identifier is doubly defined is omitted for the sake of simplification. It is explained below.

In order to prevent duplicate definition of table name, when a new table name is registered into the table registration table 302 in the step 509, the duplication with the registered table name is checked. If there is duplication, an error message is displayed and the process is terminated. If there is no duplication, the above registration procedure is executed.

In order to prevent definition of duplicate item name to one table, when the item registration table 303 is updated in the step 611, a similar check is done.

6. Table Setting Area

The table setting area 104 processes commands on display and setting of the item values in the table. The commands include a listt command for table display and item display, and a sett command for item setting.

6.1 Table Display Command Listt

An input format of this command is listt table name

Figures 11, 12:
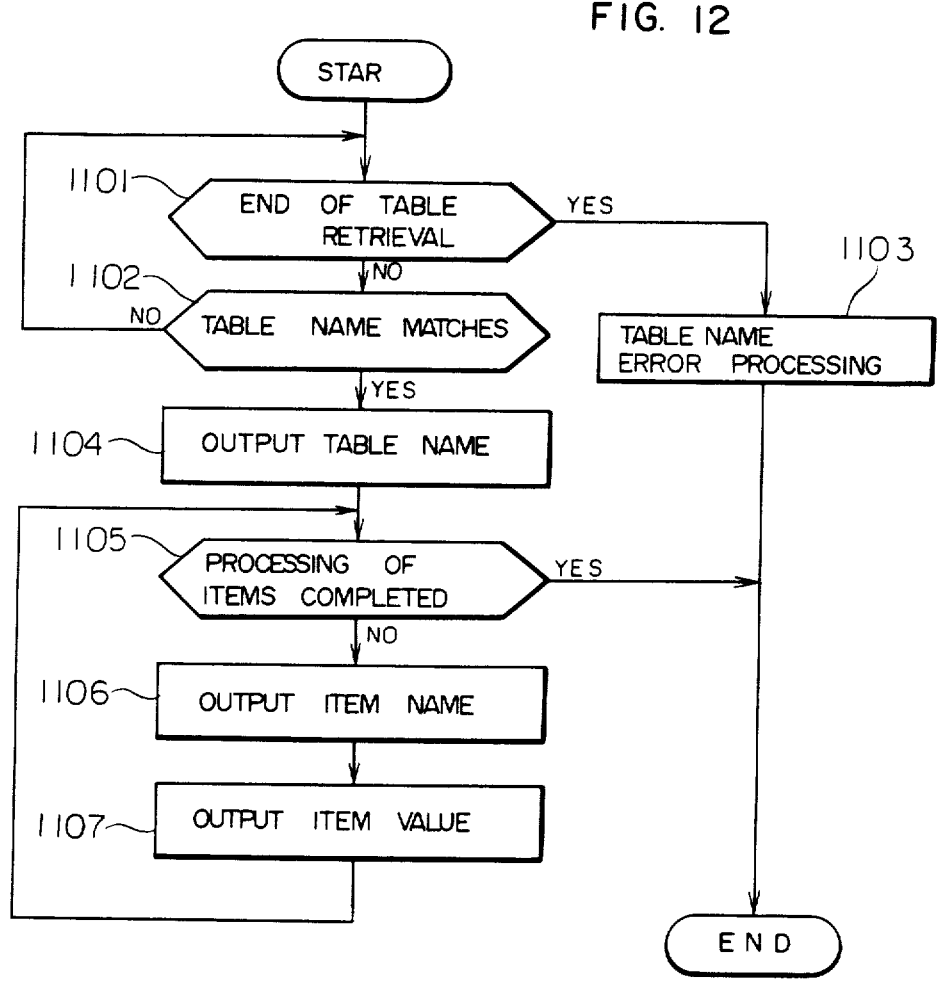
FIG. 11 shows a display of table display processing of a table setting area.
FIG. 12 is a flow chart of table display processing procedure of the table setting area.

For this command, all items in the table are displayed as shown in FIG. 11.

FIG. 12 is a flow chart of a table display process.

(1) In a step 1101, whether all of the registered table names of the table registration table 302 have been checked or not is checked. If they have, it means that the designated table name has not been registered, and an error message is displayed in a step 1103 and the process is terminated. If they have not, the process proceeds to a step 1102.

(2) In the step 1102, whether the table name currently retrieved from the table registration table 302 matches to the name designated by the command or not is checked. If it does not match, the process returns to the step 1101. If it matches, the table name is displayed in the step 1104 and the process proceeds to a step 1105.

(3) In the step 1105, whether those registered items of the item registration table 303 which belong to the designated table have been checked or not is checked. If they have not, the item name being retrieved is displayed in a step 1106, the item value is displayed in a step 1107 and the process returns to the step 1105.

6.2 Item Display Command listt

An input format of this command is listt table name item name

It is distinguished from the table display command of 6.1 by the number of parameters. The item display command has an item name parameter added thereto.

Figures 13, 14:
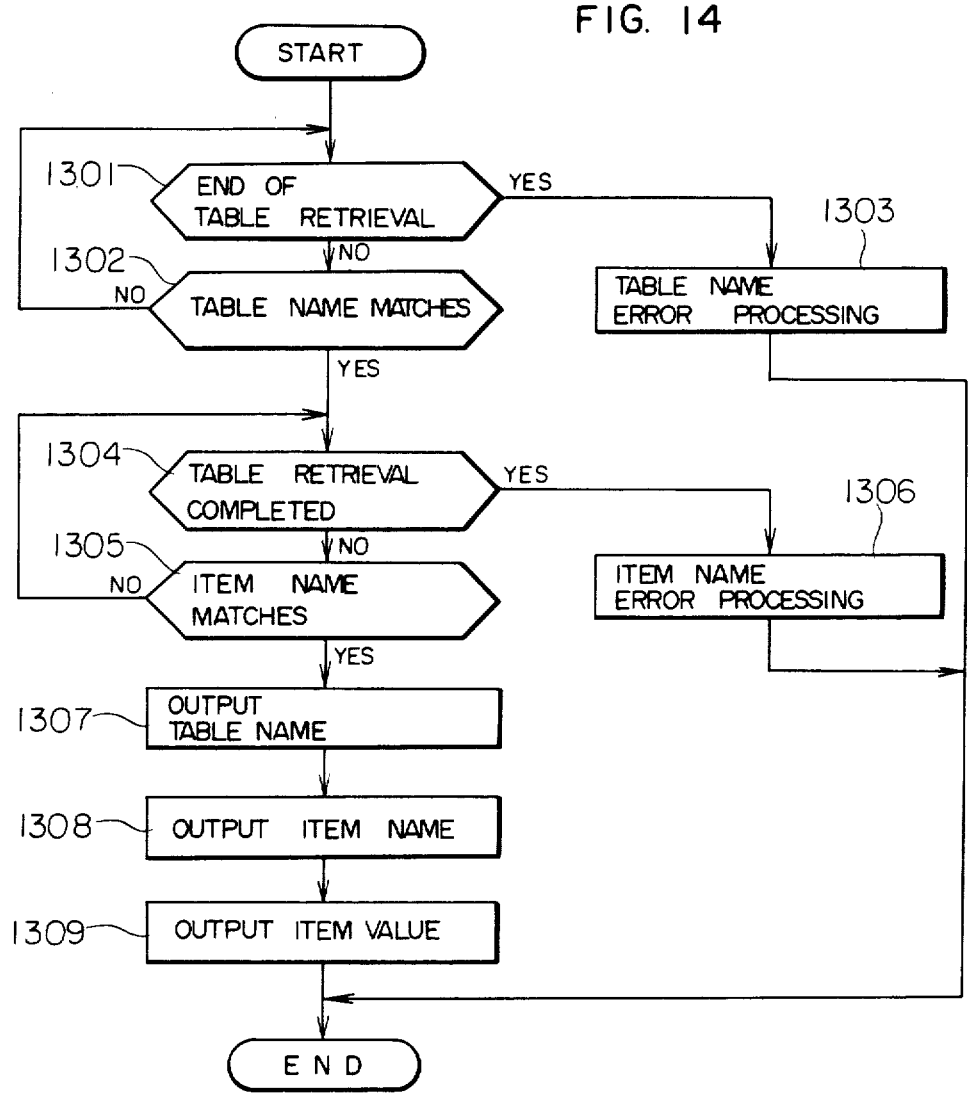
FIG. 13 shows a display of item display processing of the table setting area.
FIG. 14 is a flow chart of the item display processing procedure of the table setting area.

For this command, the value of the designated item of the table is displayed as shown in FIG. 13.

FIG. 14 is a flow chart of an item display process.

(1) In a step 1301, whether all of the registered table names of the table registration table 302 have been checked or not is checked. If they have, it means that the designated table name had not been registered, and an error message is displayed in a step 1303 and the process is terminated. If they have not, the process proceeds to a step 1302.

(2) In the step 1302, whether the table name being retrieved from the table registration table 302 matches the name designated by the command or not is checked. If it does not match, the process returns to the step 1301. If it matches, the process proceeds to the step 1304.

(3) In the step 1304, whether those registered items of the item registration table 303 which belong to the designated table have been checked or not is checked. If they have, it means that the designated item name does not belong to the table, and an error message is displayed in a step 1306 and the process is terminated. If they have not, the process proceeds to a step 1305.

(4) In the step 1305, whether the item name being retrieved from the item registration table 303 matches the name designated by the command or not is checked. If it does not match, the process returns to the step 1304. If it matches, the table name is displayed in a step 1308, the item value is displayed in a step 1309 and the process is terminated.

6.3 Item Setting Command Sett

An input format of this command is sett table name item name new item value

Figure 15:
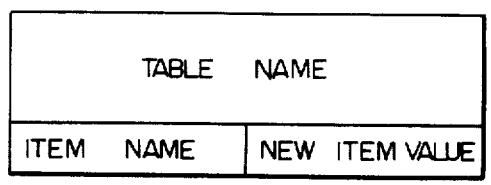
FIG. 15 shows a display of item setting processing of the table setting area.

For this command, the value of the designated item of the table is updated and the updated value is displayed as shown in FIG. 15.

Figure 16:
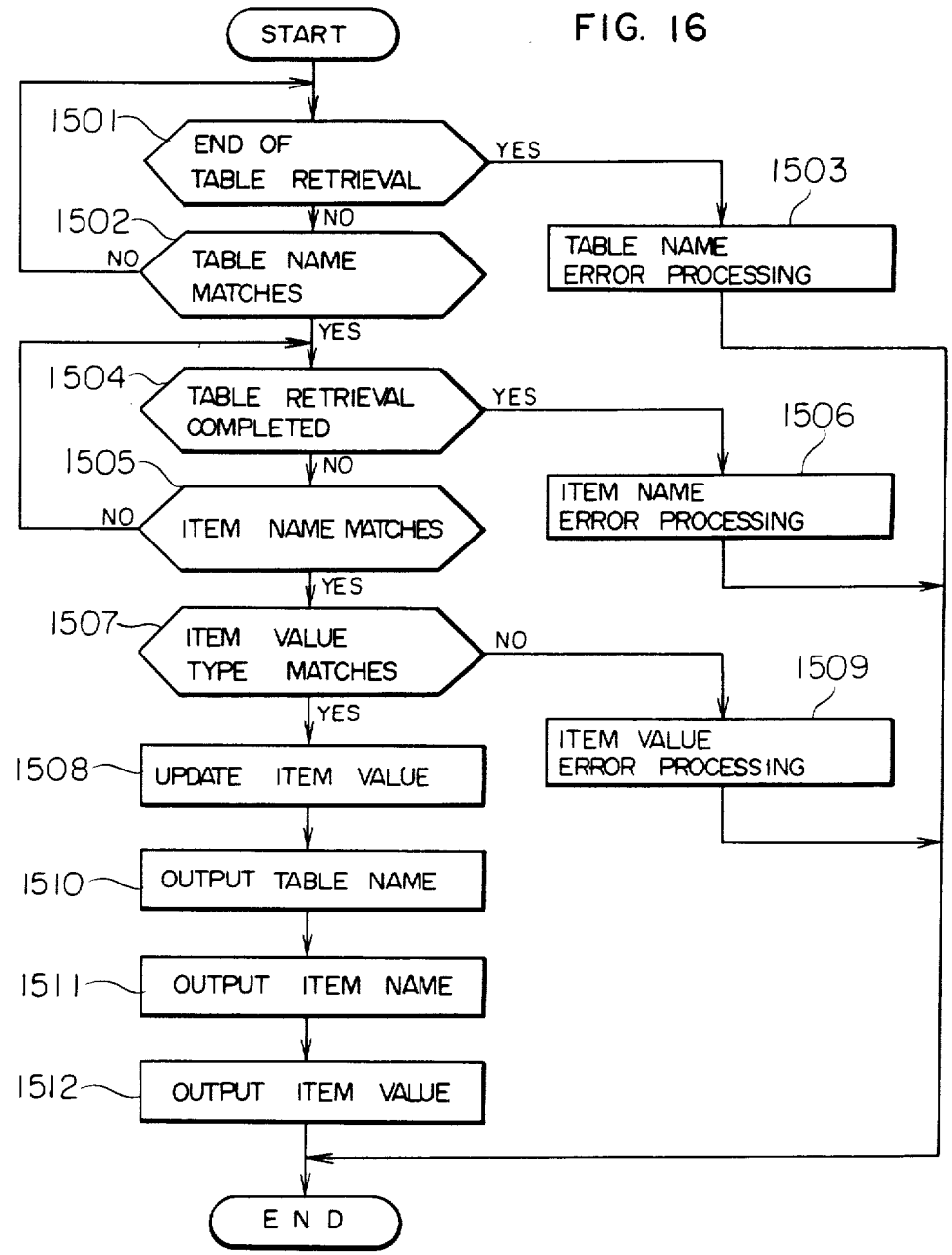
FIG. 16 is a flow chart of the item setting processing of the table setting area.

FIG. 16 is a flow chart of an item setting process.

(1) Steps 1501 to 1506 to retrieve the designated item are similar to those for the item display command of 6.2. After the retrieval, the process proceeds to a step 1507.

(2) In the step 1507, whether the type attribute of the retrieved item matches to the value type designated by the command or not is checked. If it does not match, it means that a wrong type has been designated and an error message is displayed in a step 1509 and the process is terminated. If it matches, the item value is updated in a step 1508. The table name is displayed in a step 1510, the item name is displayed in a step 1511 and the new item value is displayed in a step 1512, and the process is terminated.

7. Table Reference Processing Area

The table reference processing area 107 is an aggregation of sub-routines for referencing the item values in the table from the table utilization area. The sub-routines include a sub-routine Get Integer Value for referencing the integer type item values, a sub-routine Get Real Value for referencing the real number type item values and a sub-routine Get String Value for referencing the character string type item values.

7.1 Get Integer Value

This sub-routine has two input parameters, 'table name' and 'item name', and one output parameter, 'integer type item value'. The designated integer type item value of the designated table is returned to the output parameter as a return value.

Figure 17:
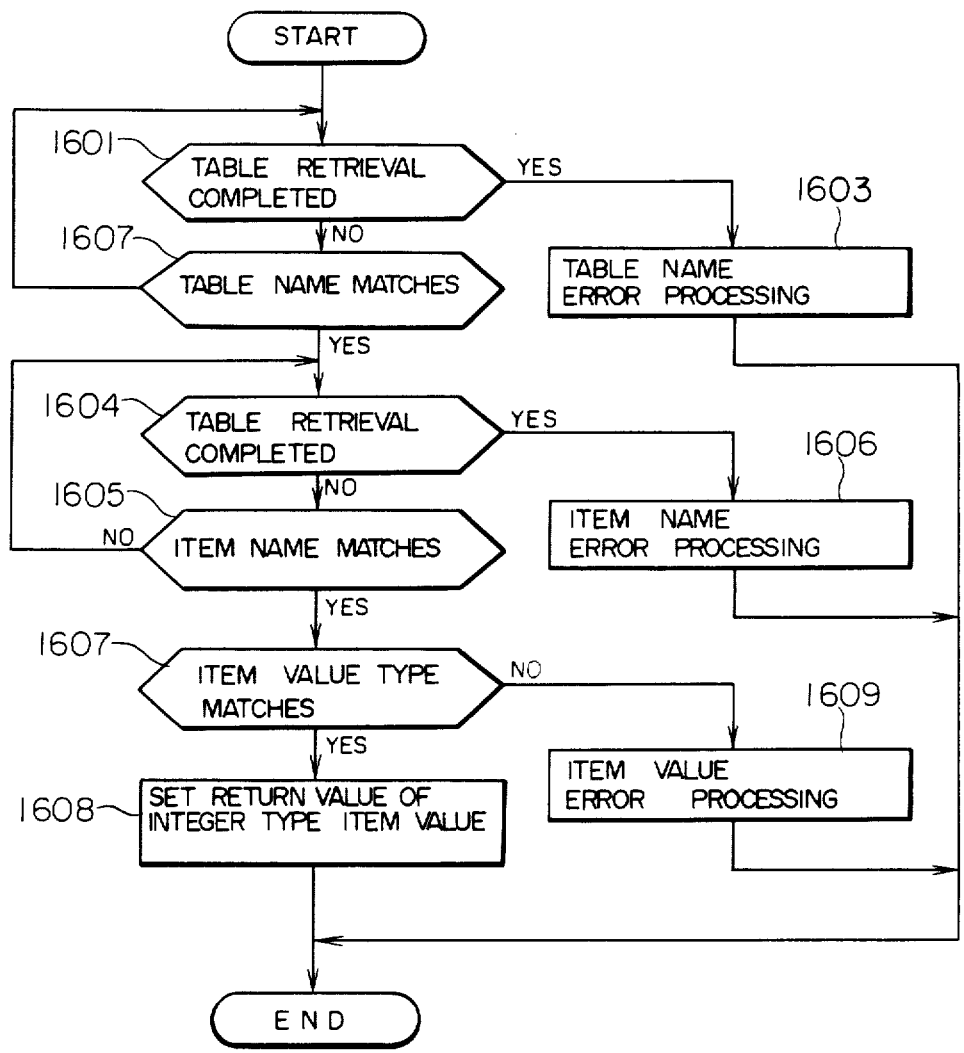
FIG. 17 is a flow chart of processing procedure of a table reference processing area (for an integer type item)

FIG. 17 shows a flow chart of a process of the sub-routine Get Integer Value.

(1) Steps 1601 to 1606 to retrieve the designated item are similar to those for the item display command of 6.2. After the retrieval, the process proceeds to a step 1607.

(2) In the step 1607, whether the type attribute of the retrieved item is integer type or not is checked. If it is not, an error message is displayed in a step 1609 and the process is terminated. If it is, the item value of the integer type item value registration table 304 is set as a return value and the process is terminated.

7.2 Get Real Value

This sub-routine has two input parameters, 'table name' and 'item name', and one output parameter, 'real number type item value'. The value of the designated real number type item of the designated table is returned to the output parameter as a return value.

Figure 18:
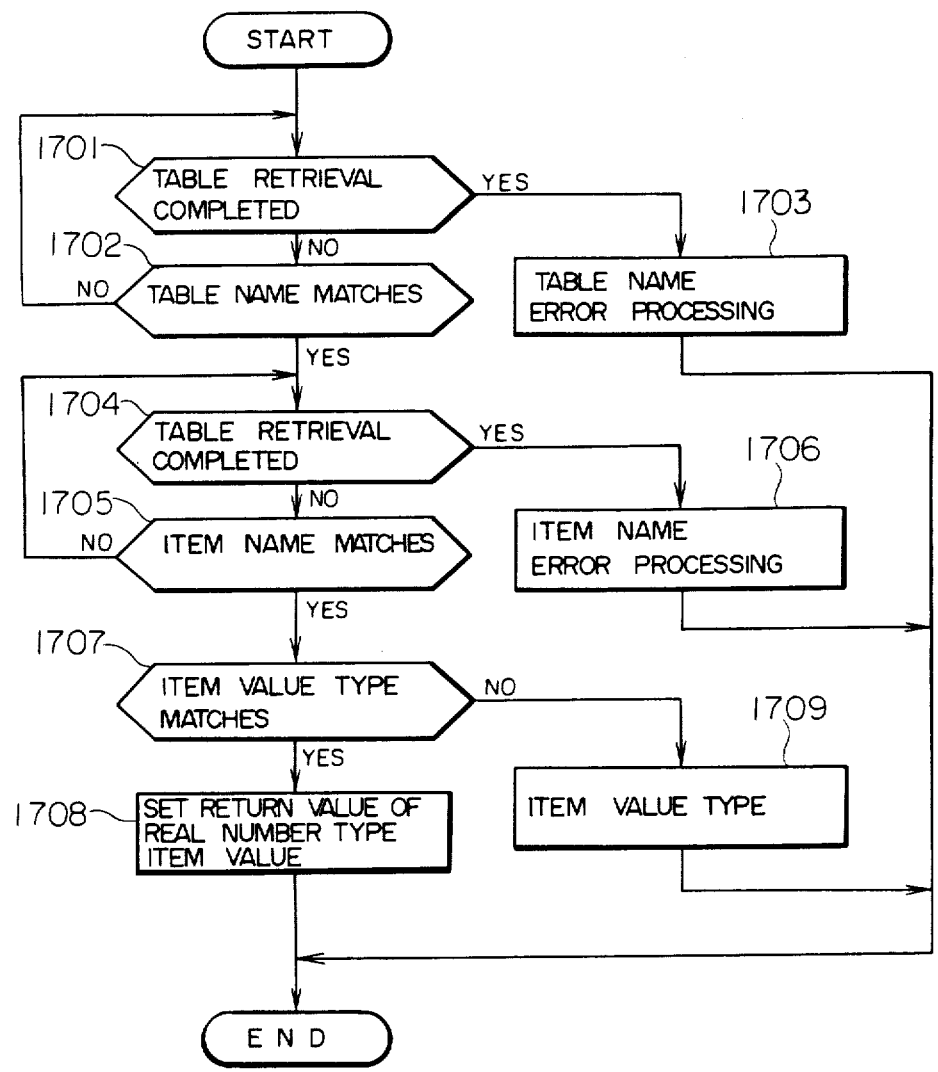
FIG. 18 is a flow chart of table reference processing procedure (for a real number type tiem)

FIG. 18 shows a flow chart of the sub-routine Get Real Value. The process is essentially identical to that of the sub-routine gGet Integer Value of 7.1 except that a step 1707 checks whether the type attribute is real number type or not and a step 1708 gets the item value from the real number type value registration table 305.

7.3 Get String Value

The sub-routine has two input parameters, 'table name' and 'item name', and two output parameters 'character string type item value' and 'character string length'. The value of the designated character string type item of the designated table and the number of characters of that value are returned to the output parameters as return values.

Figure 19:
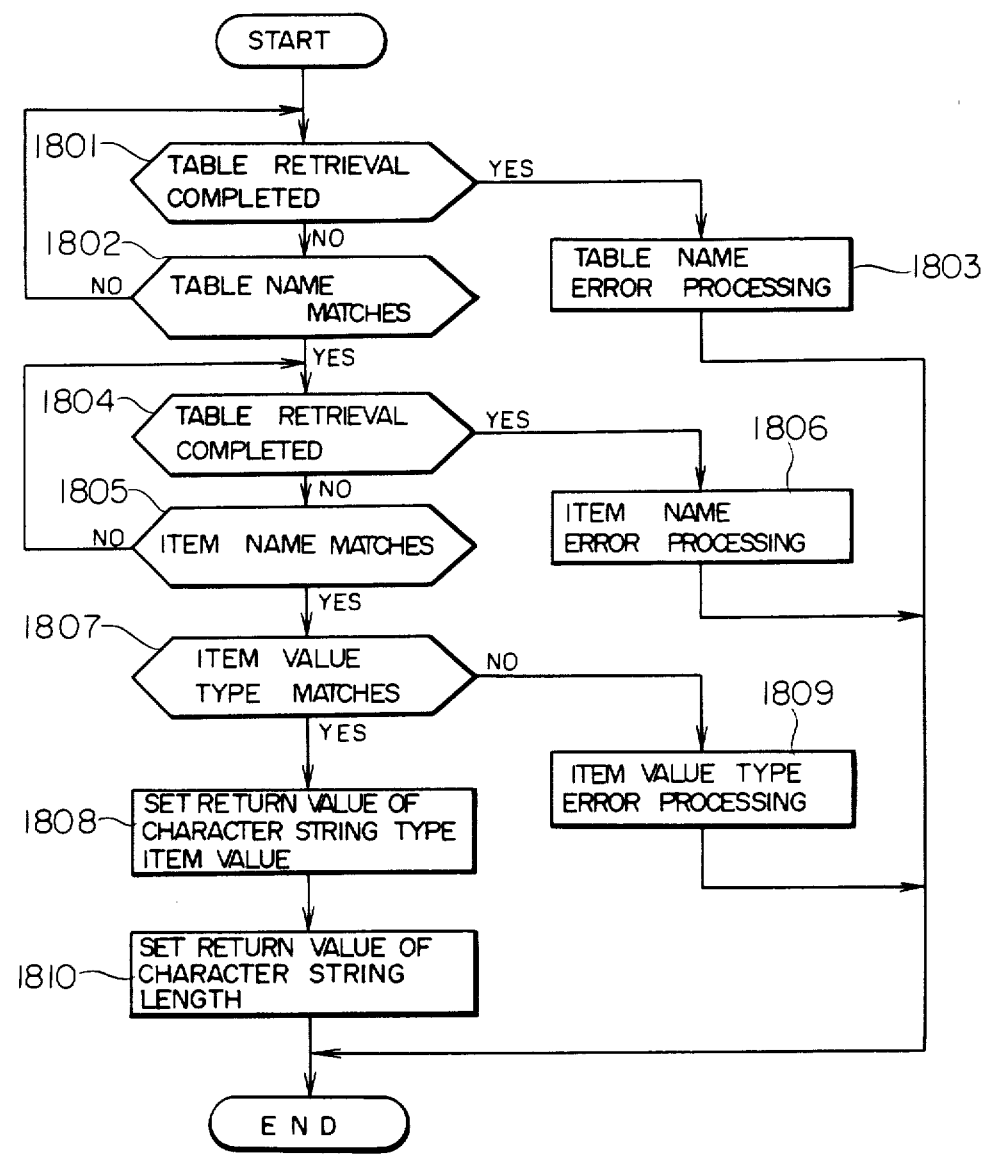
FIG. 19 is a flow chart of processing procedure of the table reference processing area (for a character string type item)

FIG. 19 shows a flow chart of the sub-routine Get String Value. The process is essentially same as that of the sub-routine Get Integer Value of 7.1 except that a step 1807 checks whether the type attribute is character string type or not, a step 1808 gets the item value from the character string type item value registration table 306, and a step 1810 sets the character string length as a return value.

Figure 20:
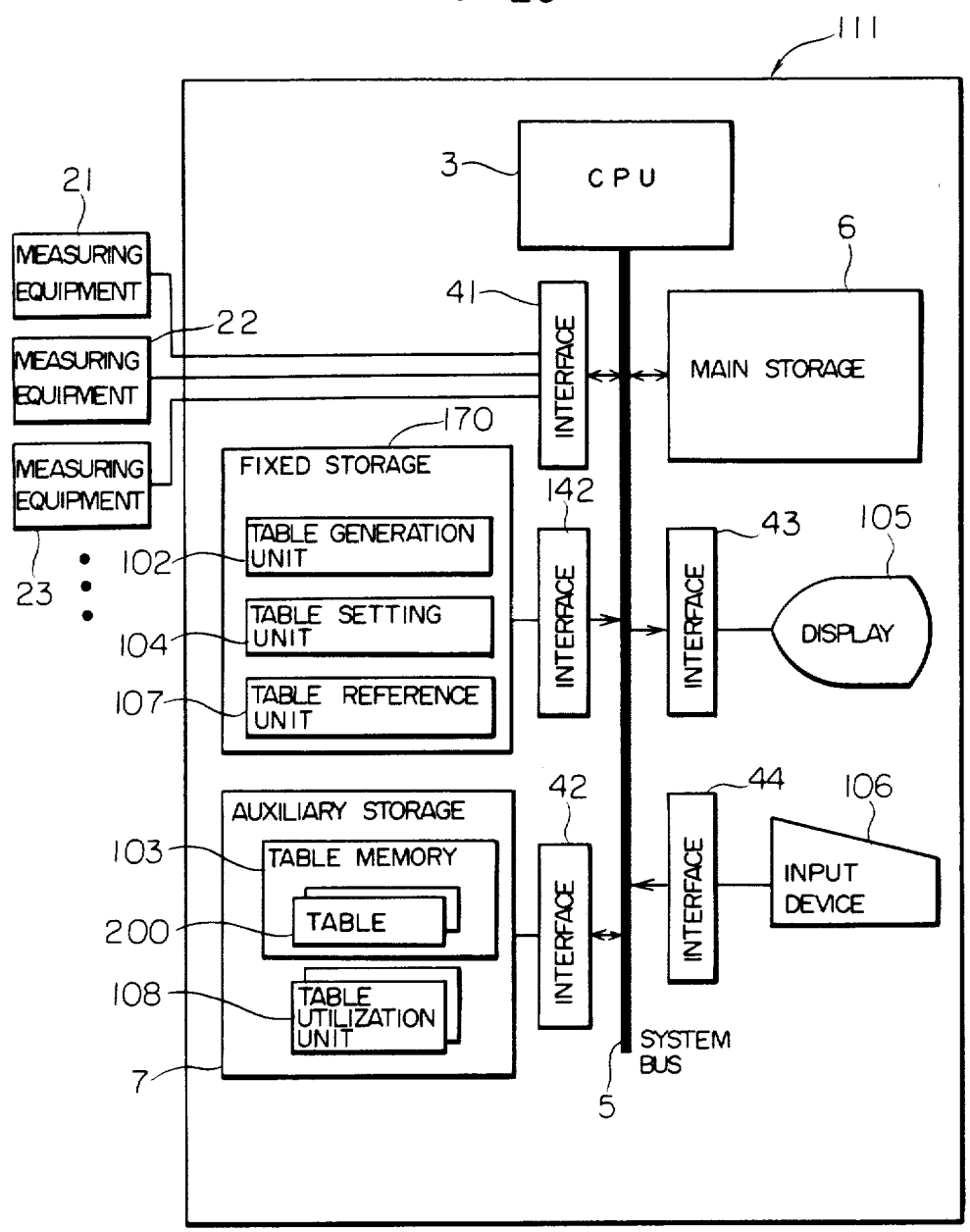
FIG. 20 shows a configuration of another embodiment of the present invention.

FIG. 20 shows another embodiment of the present invention. In FIG. 20, the like numerals to those of FIG. 1 designate the like elements. The analysis processor 111 of FIG. 20 is different from the analysis processor 1 of FIG. 1 is that the table generation unit 102, table setting unit 104 and table reference unit 107 which are stored in the auxiliary memory 7 in the embodiment of FIG. 1 are stored in a fixed storage such as an ROM in the embodiment of FIG. 20. The fixed storage 170 is connected to the system bus 5 through the interface 142. In the embodiment of FIG. 20, the table memory 103 and the table utilization unit 108 are stored in the auxiliary storage 7. Since the registration/correction processing of the parameter table is common to the respective analysis processings, the processing units 102, 104 and 107 are stored in the fixed storage 170 and mounted in the analysis processor 111. Thus where a different analysis processing can be performed by the analysis processor, by loading in the analysis processor 111 the auxiliary storage 7 such as a floppy disk which contains the table 200 necessary for the analysis processing and the table utilization unit (analysis processing program) which indicates the procedure of the analysis processing. Accordingly, a plurality of different analysis processings can be easily and inexpensively processed by one analysis processor.

While the analysis processor is used in the above embodiments, the present invention is applicable to a general data processor.

In accordance with the present invention, the processing units for table content setting and reference may be shared by various data processors so that the number of steps for developing a system related to the parameter table management can be reduced.

Since the table content can be referenced by a logical method by the table name and the item name, a user can uniquely expand a function in cooperation with the processing function of the standard system.

We claim:

1. A data processor utilizing a plurality of parameter tables having various objects to be processed for setting a processing condition and processing data of a particular object to be processed in accordance with a set of the tables, comprising:
   storage means for storing a measured data processing procedure utilizing said set of tables;
   table memory means for storing a plurality of tables each including information of a table structure of a table;
   a central processing unit (CPU) connected to said storage means for processing measured data in accordance with the measured data processing procedure stored in said storage means;
   input means connected to said CPU for inputting external information to said CPU;
   output means connected to said CPU for outputting a result of said measured data processing procedure;
   table generation means connected to said CPU, said input means and said table memory means for generating a table structure in said table memory means based on a table specification description defining a table structure, said table specification description including a table name, item names and a type attribute of the item names and being supplied by said input means;
   table content setting means connected to said CPU, said input means and said table memory means for setting a desired parameter into a desired table of said table memory means in response to a table setting command input by said input means; and
   table content reference means connected to said CPU, said input means and said table memory means for referring to a content of a desired table of said table memory means in response to a table reference command input by said input means and outputting from said output means the content referred to by said table content reference means;
   wherein said table generation means stores an input table name and a number of items into a first table and stores an input item name into a second table in response to said table specification description, and stores in the first table a pointer for pointing to a memory location of said table memory means of the item name inputted to said second table; and
   wherein said table generation means stores in a column of the input item name of the second table a type attribute and a pointer for pointing to a memory location in said table memory means of an item value table to be stored.

2. A data processor according to claim 1, wherein said input means inputs a table name, item names and renewed item values as input information, and said table content setting means sets the renewed item values into a corresponding item value table in accordance with the contents of said first and second tables.

3. A data processor according to claim 2, wherein said input means inputs table name and item names as input information, said table content referencing means retrieves a corresponding item value table in accordance with the contents of said first and second tables and supplies it to said output means.

4. A data processor according to claim 1, wherein at least one measuring equipment is connected to said CPU for detecting a measured data from an object to be processed and supplying said measured data to said CPU.

5. A data processor according to claim 1, wherein said processing procedure storage means and said table memory means are included within auxiliary storage means.

6. A data processor according to claim 5, wherein said table generation processing means, said table content setting means and said table content referencing means are included within fixed storage means.

7. A data processor according to claim 1, wherein said data processor is an analysis processor.

* * * * *